(12) United States Patent
Andreev et al.

(10) Patent No.: US 7,493,519 B2
(45) Date of Patent: Feb. 17, 2009

(54) RRAM MEMORY ERROR EMULATION

(75) Inventors: Alexander E. Andreev, San Jose, CA (US); Vojislav Vukovic, Santa Clara, CA (US); Sergey Gribok, Santa Clara, CA (US)

(73) Assignee: LSI Corporation, Milpitas, CA (US)

( * ) Notice: Subject to any disclaimer, the term of this patent is extended or adjusted under 35 U.S.C. 154(b) by 470 days.

(21) Appl. No.: 11/257,470

(22) Filed: Oct. 24, 2005

(65) Prior Publication Data

US 2007/0094534 A1 Apr. 26, 2007

(51) Int. Cl.
*G06F 11/00* (2006.01)
(52) U.S. Cl. .................................................... 714/29
(58) Field of Classification Search ............. 714/8, 714/29; 711/170
See application file for complete search history.

(56) References Cited

U.S. PATENT DOCUMENTS

| | | | | |
|---|---|---|---|---|
| 4,901,259 A | * | 2/1990 | Watkins | 703/2 |
| 5,051,938 A | * | 9/1991 | Hyduke | 703/15 |
| 5,602,987 A | * | 2/1997 | Harari et al. | 714/8 |
| 5,748,875 A | * | 5/1998 | Tzori | 714/29 |
| 5,758,063 A | * | 5/1998 | Lindsay et al. | 714/41 |
| 5,819,065 A | * | 10/1998 | Chilton et al. | 703/24 |
| 5,832,251 A | * | 11/1998 | Takahashi | 703/23 |
| 5,970,240 A | * | 10/1999 | Chen et al. | 703/25 |
| 6,675,334 B2 | * | 1/2004 | Wadley | 714/727 |
| 6,742,142 B2 | * | 5/2004 | Takasugi et al. | 714/29 |
| 6,829,574 B1 | * | 12/2004 | Ito et al. | 703/28 |
| 6,868,375 B1 | * | 3/2005 | Margulieux | 703/25 |
| 7,389,218 B2 | * | 6/2008 | Lee | 703/23 |
| 2001/0016922 A1 | * | 8/2001 | Takasugi et al. | 714/29 |
| 2003/0110411 A1 | * | 6/2003 | Harari et al. | 714/8 |
| 2004/0019827 A1 | * | 1/2004 | Rohfleisch et al. | 714/29 |

\* cited by examiner

*Primary Examiner*—Robert Beausoliel
*Assistant Examiner*—Amine Riad
(74) *Attorney, Agent, or Firm*—Luedekas, Neely & Graham, P.C.

(57) ABSTRACT

A method for verifying the functionality of a repair system of configurable memory that functions to replace memory that fails predetermined tests with unused memory that passes the tests. The method includes the steps of providing a matrix comprising a plurality of reconfigurable memory blocks, providing an emulation system, generating a substitute memory block for each of the reconfigurable memory blocks utilizing the emulation system computing platform, providing a memory design that incorporates the substitute memory blocks, generating files for mapping errors into the reconfigurable memory blocks and providing a control file associated with the emulation system, and operating the emulation system to emulate the memory design.

4 Claims, 10 Drawing Sheets

|   | ID=8 | CONF=1 | TYPE=2 | ADDR=11 | MSK1=20 | RT=1 |
|---|------|--------|--------|---------|---------|------|
| 0 | 1 | 3 | 0c0 | 00000 | 00000 | 0 |
| 1 | 0 | 0 | 000 | 00000 | 00000 | 0 |
| 2 | 0 | 0 | 000 | 00000 | 00000 | 0 |
| 3 | 1 | 3 | 08e | 00000 | 00000 | 0 |
| 4 | 0 | 0 | 000 | 00000 | 00000 | 0 |
| 5 | 0 | 0 | 000 | 00000 | 00000 | 0 |
| 6 | 1 | 0 | 043 | 00000 | 00080 | 0 |
| 7 | 0 | 0 | 000 | 00000 | 00000 | 0 |
| 8 | 0 | 0 | 000 | 00000 | 00000 | 0 |

RRAM MEMORY ERROR EMULATION

FIELD

This invention relates to the field of integrated circuit fabrication utilizing reconfigurable computing platforms. More particularly, this invention relates to a method for verifying the functionality of built in repair systems of reconfigurable memory using an emulation system.

BACKGROUND

Integrated circuits are often formed using an application specific integrated circuit architecture, which tends to reduce the design costs of the integrated circuit by using predetermined logic blocks in a somewhat customized arrangement to produce an integrated circuit according to a customer's specifications. One aspect of such a customizable integrated circuit design is referred to as RRAM.

RRAM (Reconfigurable RAM) contains sets of memories of the same type that are placed compactly within a memory matrix. An RRAM, as the term is used herein, is a megacell that can be considered as a set of memories with built-in self testing and built-in self correction systems. During each power-up phase, the self testing/correction systems identify any RAM blocks that fail predetermined tests and replace them with unused RAM blocks that pass the tests.

Field Programmable Gate Array (FPGA) hardware emulation systems are typically used to verify large, complex circuit designs prior to fabrication as chips. However, during the verification process, the identification of any failed RAM blocks will necessitate modification of the emulation board.

What is needed, therefore, is a need for a method for verifying the functionality of built in repair systems of reconfigurable memory using a Field Programmable Gate Array (FPGA) hardware emulation system.

SUMMARY

The above and other needs are met by a method for verifying the functionality of a repair system of configurable memory that functions to replace memory that fails predetermined tests with unused memory that passes the tests.

The method includes the steps of providing a matrix comprising a plurality of reconfigurable memory blocks, providing an emulation system, generating a substitute memory block for each of the reconfigurable memory blocks utilizing the emulation system computing platform, providing a memory design that incorporates the substitute memory blocks, generating files for mapping errors into the reconfigurable memory blocks and providing a control file associated with the emulation system, and operating the emulation system to emulate the memory design.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 8 is a chart depicting an excerpt from an input file of a RAM block that is used for printing an error map ROM content file in connection with the method steps of FIG. 1.

FIG. 10 is a chart showing an exemplary post-calculation output matching the substitute memory blocks to corresponding RAM base blocks.

DETAILED DESCRIPTION

Figure 1:
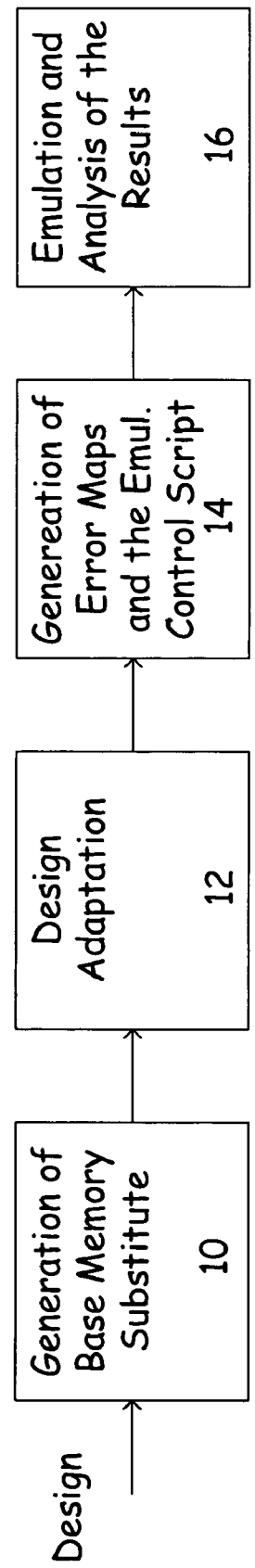
FIG. 1 is a flow chart showing steps in a preferred method for verifying the functionality of a built in repair system of an integrated circuit design having reconfigurable memory.

With reference to FIG. 1, there are shown steps in a preferred method for verifying the functionality of a built in repair system of configurable memory, such as RRAM. As noted previously, the repair system should function to replace any RAM blocks that fail predetermined tests with unused RAM blocks that pass the tests. The method uses a hardware emulator, preferably a Field Programmable Gate Array (FPGA) hardware emulator available under the trade name VStation from Mentor Graphics Corporation of Wilsonville, Oreg. It will be understood that other emulation systems may be utilized.

In a first step 10, substitute memory is generated utilizing the emulation system computing platform. The substitute memory preferably includes programmable error capability for each base RAM block of the RRAM. In a next step 12, a memory design is adapted to incorporate the substitute memories and to be emulated by the emulation system. Next, in step 14, files are generated for mapping errors into the RAM blocks of the RRAM and a control file associated with the emulation system computing platform. Finally, in step 16, the emulation is performed by the emulation system computing platform and the results are analyzed.

Generation of Matrix-RAM Base Memory Substitutes

Figure 2A:
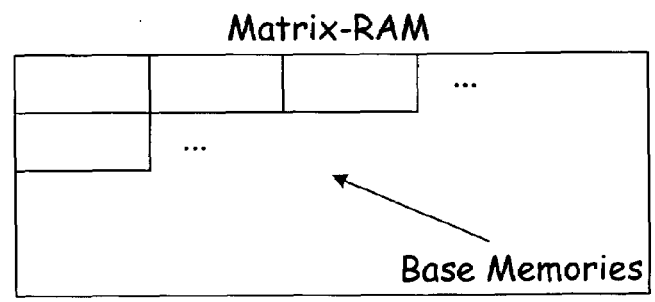
FIG. 2A is a schematic diagram of a block of reconfigurable memory with which the method is used.
Figure 2B:
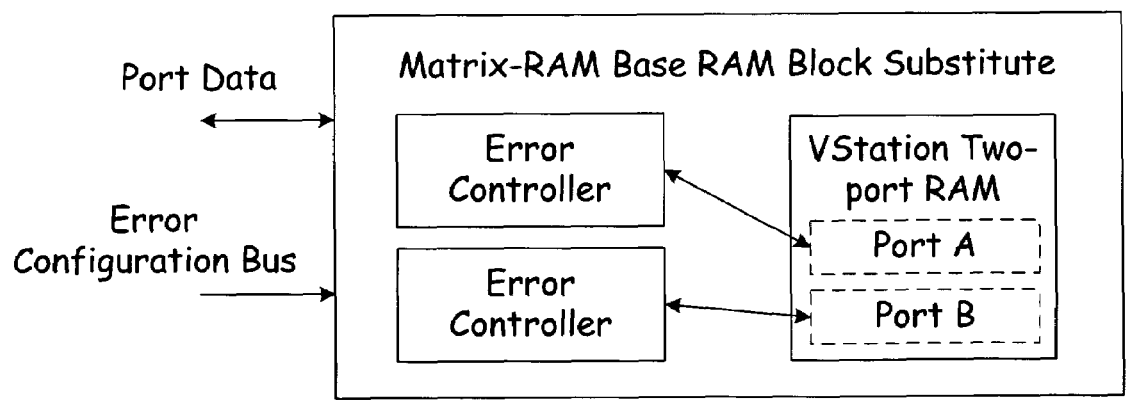
FIG. 2B is a schematic diagram of a substitute memory utilized in the method.

Each block of RRAM includes a predetermined number of base RAM blocks. With reference to FIG. 2A, there is shown a schematic of a representative two-port RAM base block 20. Substitute memory corresponding to each RAM base block 20 is generated in step 10, producing a netlist for implementation on the emulation platform described herein. With reference to FIG. 2B, there is shown a schematic of a representative substitute memory block 22. Each substitute memory block 22 includes a pair of error controller modules 24 and 26, and a substitute RAM 28 having a port A and a port B.

Figure 3:
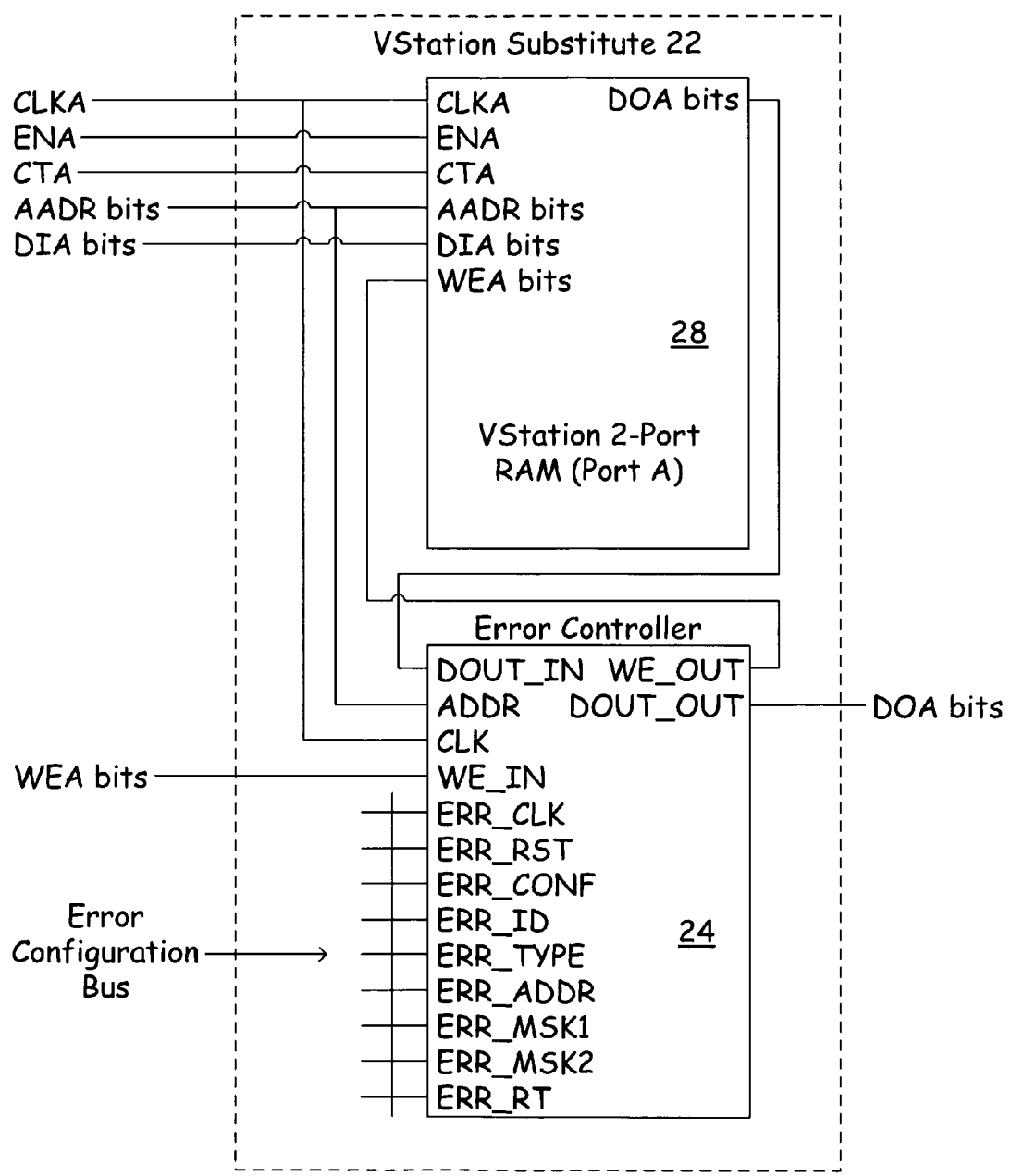
FIG. 3 is a detailed diagram of showing connections of the substitute memory of FIG. 2B.

The error controller modules 24 and 26 are operatively associated with the ports A and B, respectively, and enable the substitute memory block 22 to emulate different types of errors along with standard read/write functions associated with the substitute memory block 22. A detailed view of the interconnections between port A of the substitute memory block 22 and the error controller 24 are shown in FIG. 3.

VStation Two-Port RAM

Figure 4:
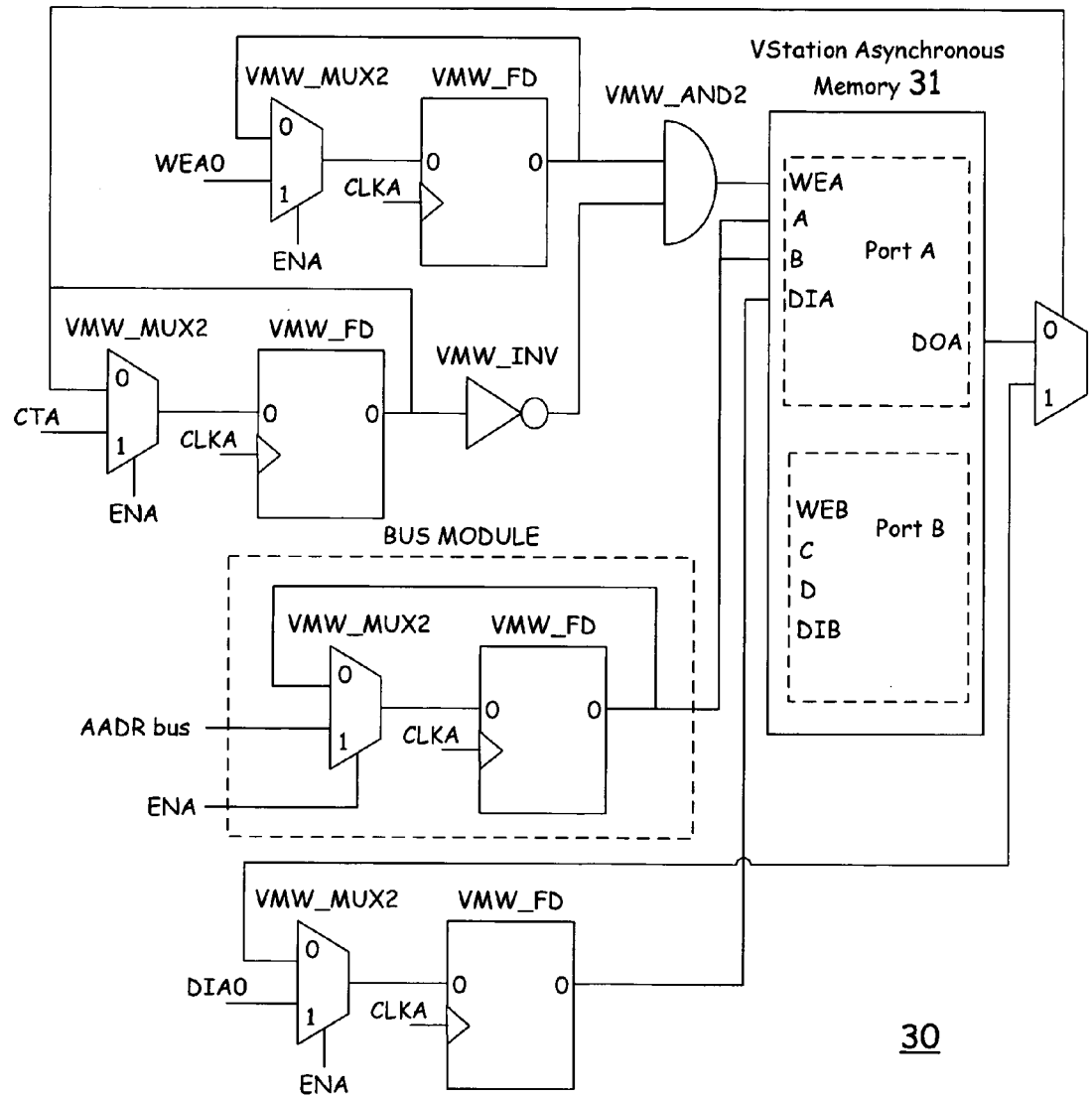
FIG. 4 depicts a building block for the VStation RAM for one bit and one port.

As noted above, in the step 12 a memory design is adapted to incorporate the memory of the substitute memory blocks 22 and to be emulated by the emulation system. With reference to FIG. 4, there is seen a representation of a single block portion of a memory design 30. One complete memory design 30 preferably contains a number of the blocks shown in FIG. 4 corresponding to twice the width of the data bus.

Each memory design 30 is made utilizing a VStation asynchronous memory block associated with the preferred VStation emulation system. This block, shown in FIG. 4 as 31, has ports A and B and is synchronized to a clock port, such as CLKA. As will be noted, the RAM base block 20 has a write enabled bit for every bit of data bus. However, each memory block 31 has only one bit write-enable capability. Accordingly, separate blocks are utilized for each data bit to provide write-enable functionality for the RAM base block 20. They combine blocks 31 with the same width of the address ports A as RRAM base RAM blocks 20, but just a single bit width of data and write enable ports DIA, DOA, and WEA.

Error Controller

Figure 5:
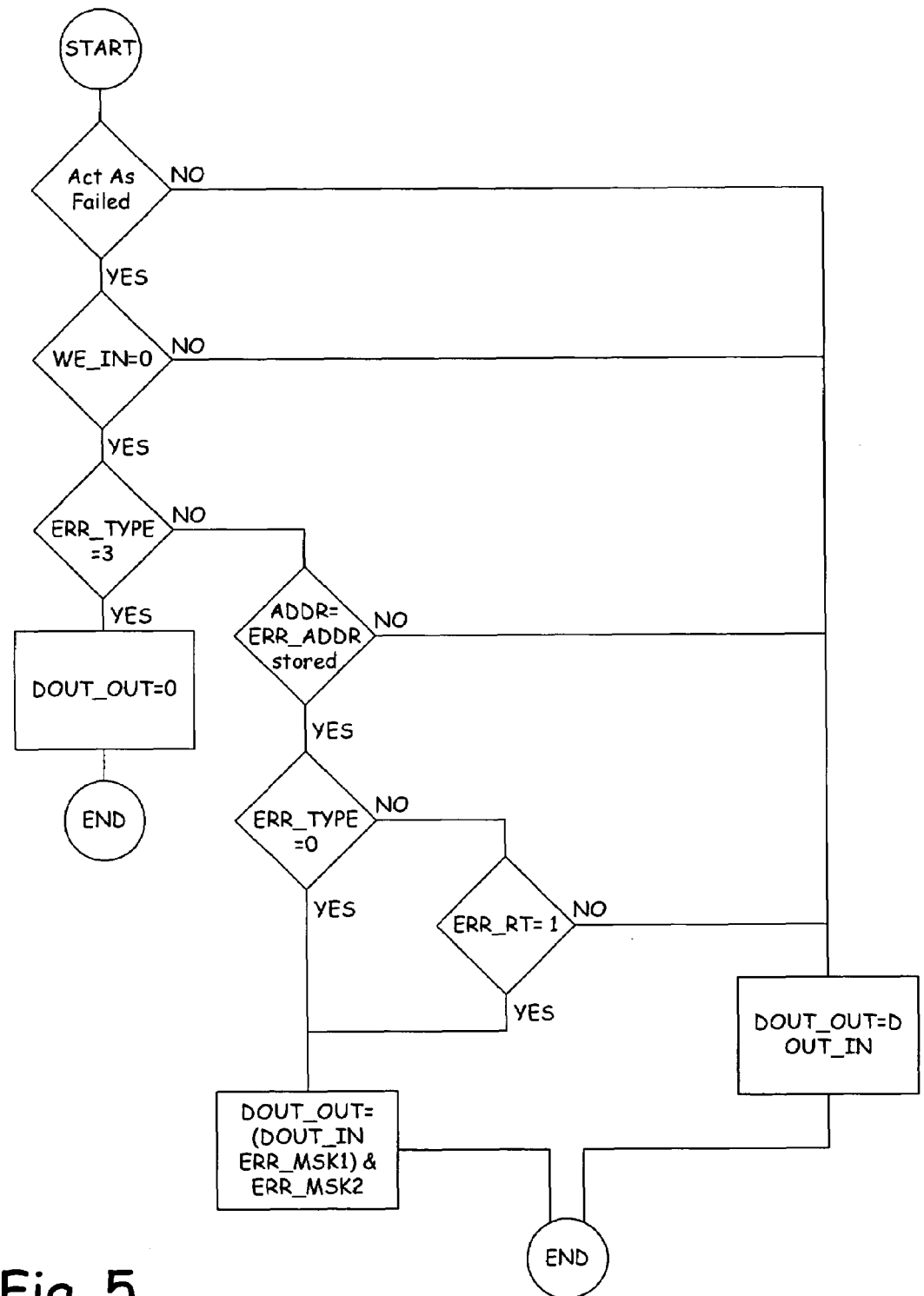
FIG. 5 is a flow chart showing steps followed by an error controller to modify the output of the memory design and send the modification at the read cycle to outside of a substitute RAM.
Figure 6:
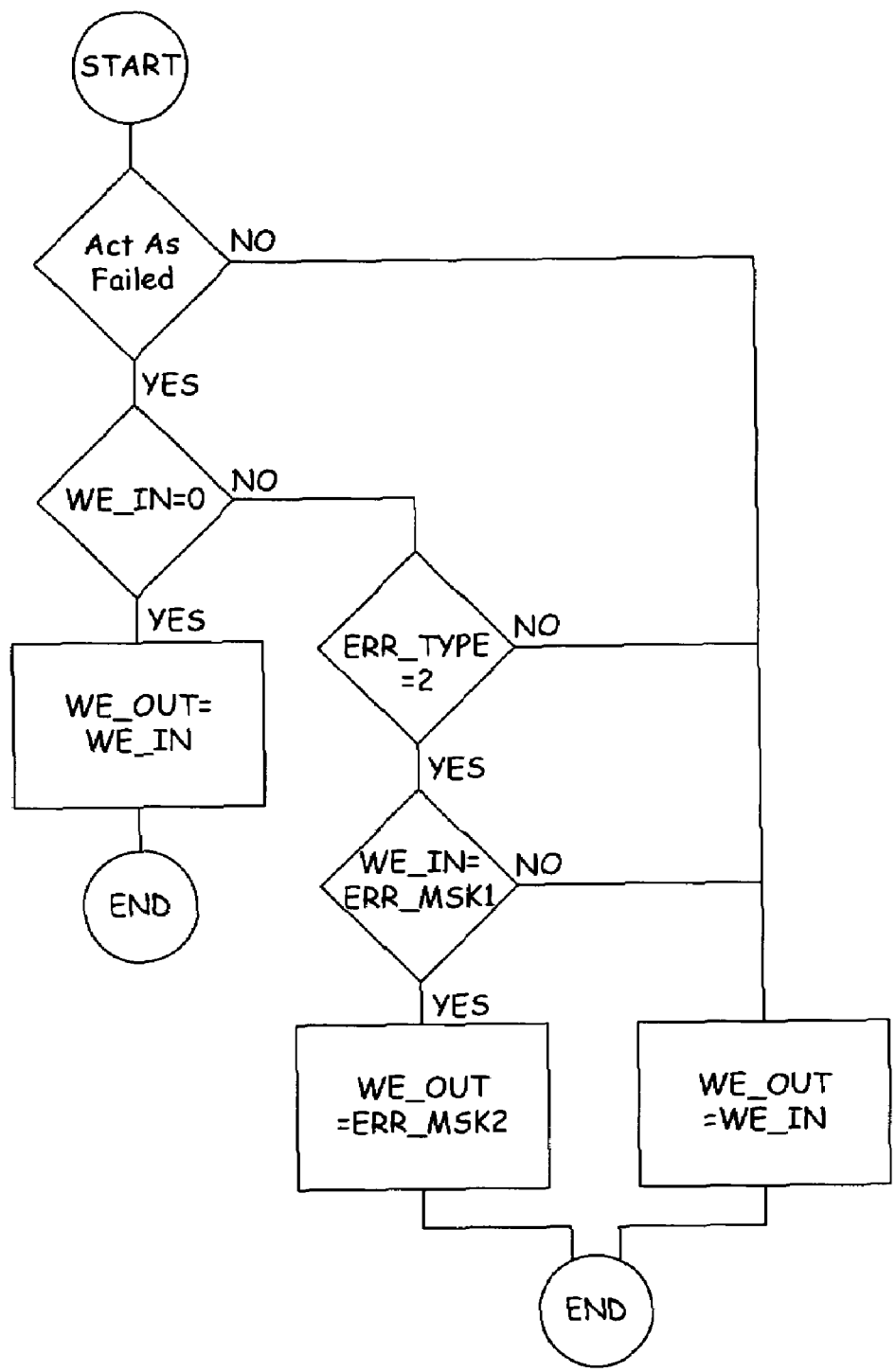
FIG. 6 is a flow chart showing steps followed by an error controller to modify a write enabled bus and send the modified version to the write enabled bus of a memory design associated with the emulation system.

Depending on the error type, the error controllers 24 and 26 can modify the write enabled bus and send the modified version to the write enabled bus of the memory design 30 associated with the emulation system, (FIG. 3, WE_IN, WE_OUT), or modify the output of the memory design 30 and send the modification at the read cycle to outside of the substitute RAM 28 (FIG. 3 DOUT_IN, DOUT_OUT). With reference to FIGS. 5 and 6, there are shown preferred steps to accomplish determination of DOUT_OUT and WE_OUT once the configuration is complete and the self-correction tools of the self testing/correction systems of the RAM blocks are initiated. The error controllers can also allow a memory to work without errors.

The error configuration bus of FIG. 3, represented by the set of ports beginning with "ERR_", may be used to set up wanted errors for a specific memory during an error configuration mode described more fully below. At such time, a set of internal registers stores the values put on the error bus, e.g., ERR_TYPE, ERR_ADDR, ERR_MSK1, ERR_MSK2, ERR_RT, for later use. The ERR_TYPE bus defines an error type (with help from the ERR_RT bit, which indicates retention testing), ERR_ADDR bus is a memory address that will have an error and ERR_MSK1 and ERR_MSK2 buses are to emulate an error for a specific data bit. A bit 0 of ERR_CONF is used to mark that a memory is free of errors.

Design Adaptation

In accordance with step 12, and utilizing software developed for this purpose that provides an appropriate output for use with the emulation system, the cells corresponding to the RAM base blocks 20 are replaced with the functionally equivalent cells of the substitute memory block 22. Concurrently, the software creates a unique identifier for each of the substitute memory block 22 and brings the error configuration bus of the error controller module 24 of the substitute memory block 22 at the top level of a design. The error configuration buses for each substitute memory block 22, represented by "Memory Subst. (id_1)" and "Memory Subst. (id_2)" in FIG. 7, are then connected into a common Errors Configuration Bus 40 (FIG. 7).

The design is thereafter wrapped into one more level of hierarchy, where additional memory for emulation is added to provide the memory designs 30. A Test Pattern Read Only Memory (ROM) 42 and an Errors Map ROM 44 (FIG. 7) receive input, respectively, from a Test Pattern Input File 46 and an Errors Map Input File 48. The input file 46 contains data corresponding to a test pattern of the self correction system of the RRAM that is to be emulated. The input file 48 contains data corresponding to a chosen error distribution. The results of testing are written into a Test Results Ram file 50 which is placed at the top level.

Figure 7:
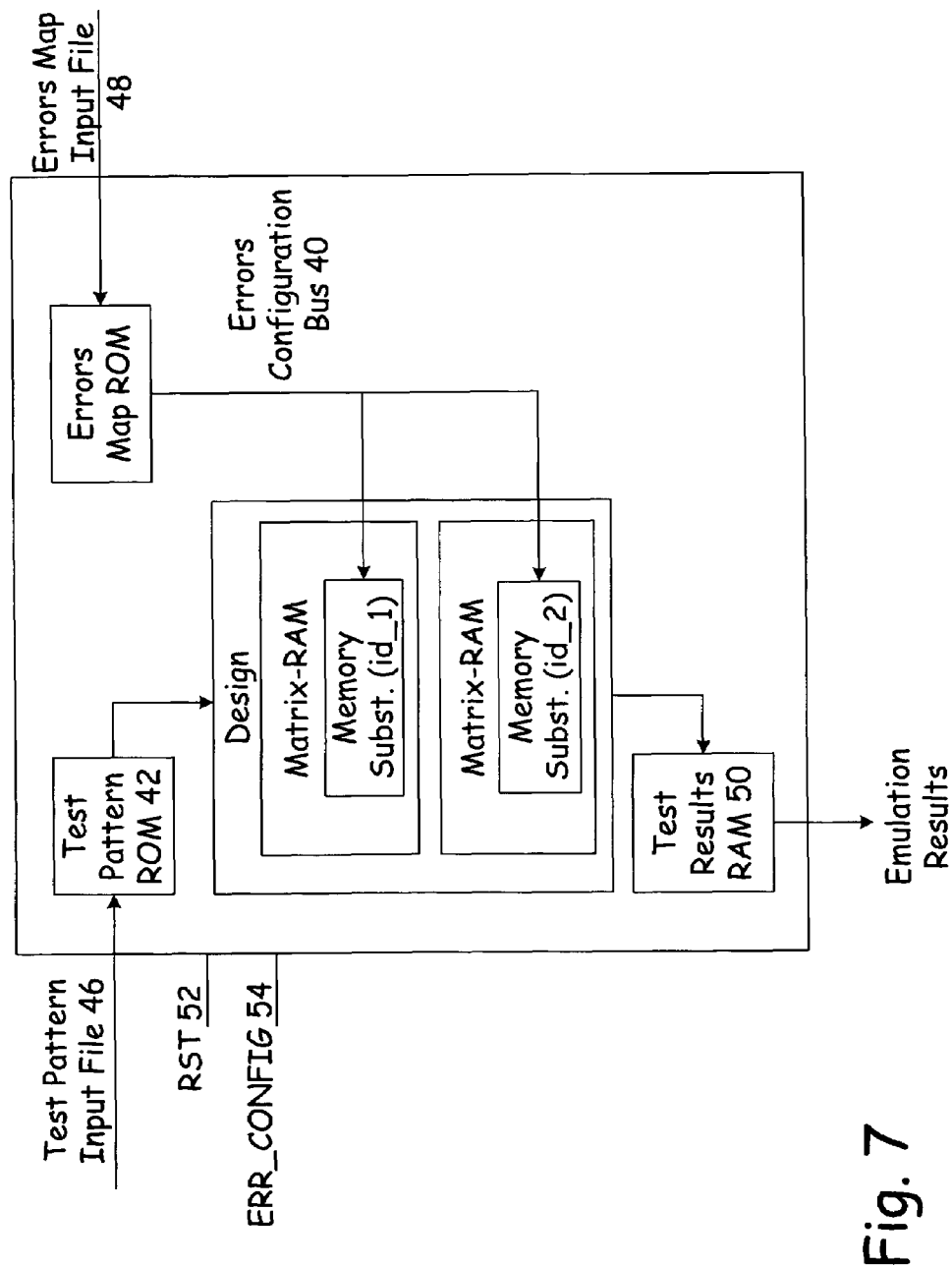
FIG. 7 is a schematic diagram of a memory design adapted to incorporate substitute memories and to be emulated by the emulation system.

It will be understood that the adapted design represented in FIG. 7 may include additional RAMs for storing test results and that they can be placed anywhere in the hierarchy. In such case, their hierarchal names may be input parameters for an external software tool. The adapted design represented in FIG. 7 also preferably includes RST port 52 and ERR_CONFIG bit 54. The port 52 is a global reset for an entire design. The bit 54 functions to activate and deactivate error configurations for the substitute memory blocks 22. Additional control logic is also incorporated into the adapted design to direct processing at the top level.

Generation of Error Maps and the Emulation Control Script

In accordance with step 14, files are generated for mapping errors into the RAM block of the RRAM as well as into a newly generated control file associated with the emulation system computing platform. That is, the data for the Test Pattern Input File 46 and the Errors Map Input File 48 is provided. With regard to the Test Pattern Input File 46, a selection is initially made as to the groups of the RAM base blocks 20 that will act as failed with a specific type of error. An example of an excerpt from an input file of a RAM block having a size of 2048×20 (width×depth) for printing an error map ROM content file is shown in FIG. 8. An output binary file based on the input file will be read into a design's ROM at the emulation time. Since the groups of the RAM base blocks 20 that will act as failed and the specific types of errors for these blocks are known, the emulation system can generate a control script to control the emulation. Accordingly, using specific commands, the script may deploy a pre-compiled trigger mechanism and coordinate changes of the RST port 52 and the ERR_CONFIG bit 54 to switch between steps of an emulation cycle.

With additional reference to FIG. 8, in this example the memories with indexes of 0, 3, and 6 are selected to emulate errors. The memories 0 and 3 correspond to a "raw" error (FIG. 5, type 3) at the hexadecimal addresses 0c0 and 08e, respectively. The memory 6 has a bad 8$^{th}$ bit at the address 043 (FIG. 5, type 0). The remaining memories have no errors.

Emulation and Analysis of the Result

Figure 9:
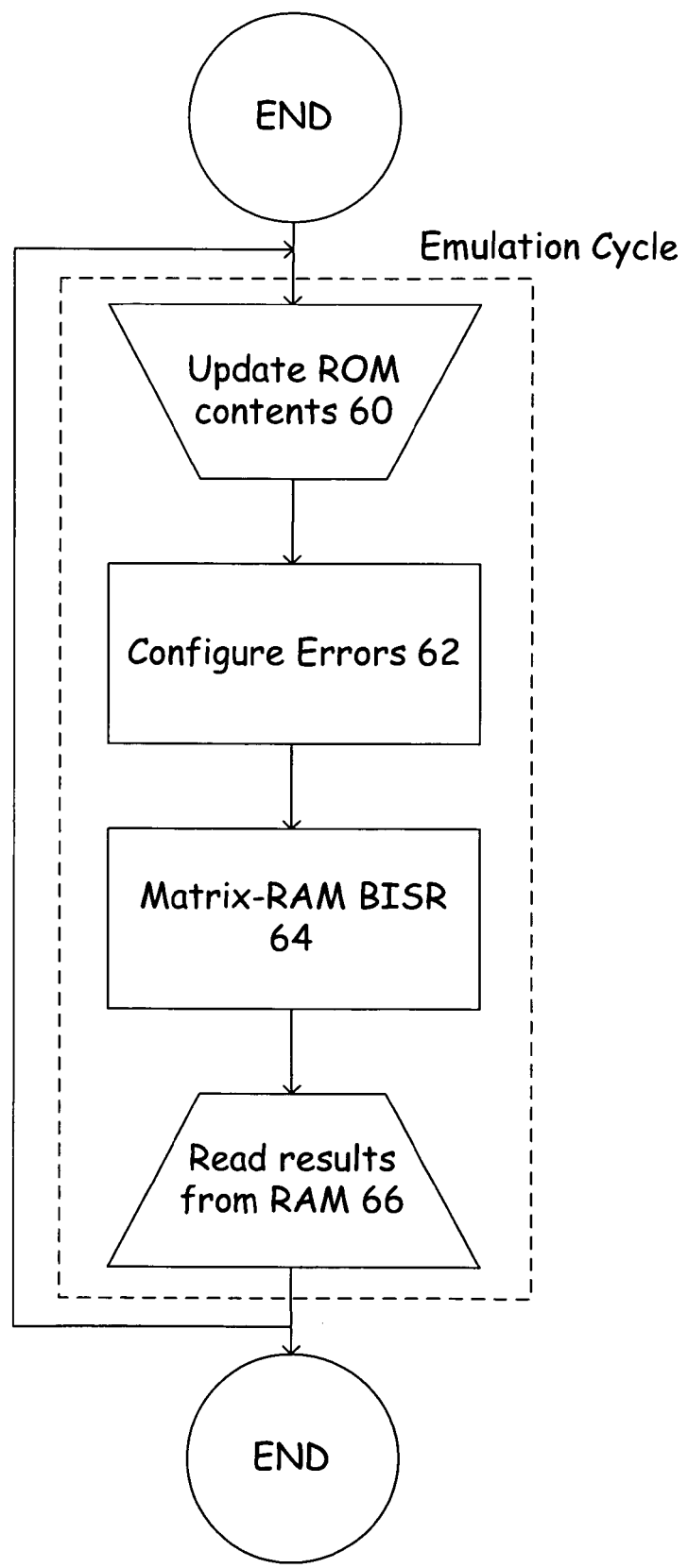
FIG. 9 is a flow chart showing steps in an emulation cycle.

As will be appreciated, the number of emulation cycles performed is dependent upon the number of memory test patterns as well as the different error types. Each emulation cycle includes the steps 60-66 as shown in FIG. 9. In step 60, the test pattern is given as initial input into the ROM 42 and the Error Map ROM 44. Next, in step 62, the errors are distributed across the RAM base blocks 20 according to the map information. In this regard, it will be understood that each of the RAM base blocks 20 is configured either as "good" or as "bad" in that it has an error. Here, when a memory reads its identification from the common Errors Configuration Bus 40, its internal error controllers 24, 26 are configured corresponding to the bus data. Next in step 64, once configuration is completed, the self test/repair systems of the RAM base blocks 20 perform their function and the results are read and saved in step 66, after which a new emulation cycle begins with a new pattern and/or error map. This process is started and controlled using the control script discussed above.

Figure 10:
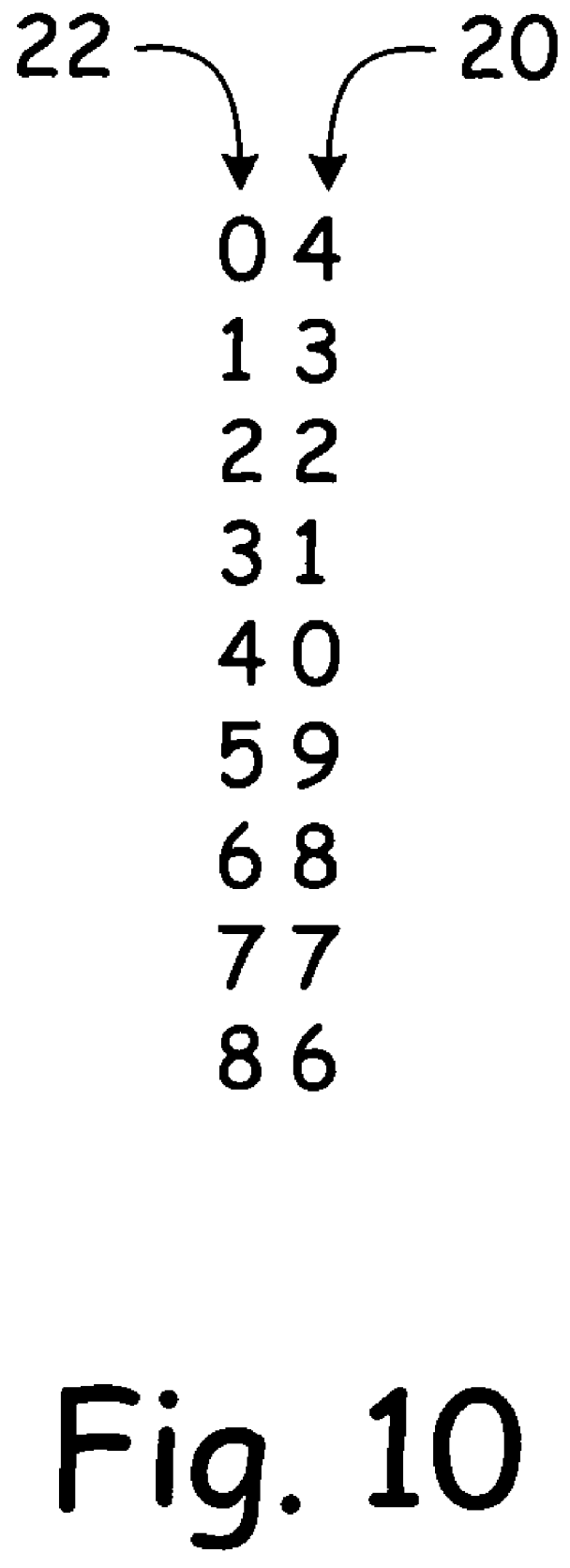

Following completion of the emulation cycles, the Test Results Ram file (50) may be analyzed, preferably using a computer program that calculates which memory identifier corresponding to a substitute memory block 22 corresponds to which RAM base block 20. As will be appreciated, the self test/repair systems of the RAM base blocks 20 identify memories based on their row/column positions. The substitute memory blocks 22 are assigned in an order corresponding to the order the memories are found in the design file. In this regard, and with reference to FIG. 10, there is shown a post-calculation output matching the substitute memory blocks 22 to corresponding RAM base blocks 20.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for verifying proper operation of a built-in self-repair module of a memory matrix design, the method comprising the steps of:

inputting the memory matrix design into a hardware emulation system, where the memory matrix design includes reconfigurable memory blocks and the built-in self-repair module, within the hardware emulation system, designating some of the reconfigurable memory blocks as failing, operating the built-in self-repair module to, locate the failing reconfigurable memory blocks, generate a substitute memory block for each of the failing reconfigurable memory blocks, update the memory matrix design to incorporate one of the substitute memory blocks for each of the failing reconfigurable memory blocks, and generate files for mapping the failing reconfigurable memory blocks to the substitute memory blocks, and checking to determine whether the built-in self-repair module detected all of the failing reconfigurable memory blocks and properly mapped the failing reconfigurable memory blocks to the substitute memory blocks.

2. The method of claim 1, wherein the reconfigurable memory blocks comprise RAM memory.

3. The method of claim 1, wherein the emulation system comprises a Field Programmable Gate Array emulation system.

4. The method of claim 1, wherein the substitute memory blocks include programmable error capability for each of the reconfigurable memory blocks.

* * * * *